US005529615A

United States Patent [19]

Rendino et al.

[11] Patent Number: 5,529,615

[45] Date of Patent: Jun. 25, 1996

[54] MARKING MATERIAL AND METHOD FOR SUSPENDING PIGMENT PARTICLES

[75] Inventors: Paula Rendino, New York, N.Y.; William Grandmont, East Bridgewater, Mass.

[73] Assignee: Playstation Inc., Newton, Mass.

[21] Appl. No.: 259,985

[22] Filed: Jun. 15, 1994

[51] Int. Cl.[6] ............................ C09D 11/00; B43K 19/00

[52] U.S. Cl. ................ 106/19 B; 106/19 E; 252/301.16; 252/301.36

[58] Field of Search ................................ 106/19 B, 19 E; 252/301.16, 301.36

[56] References Cited

U.S. PATENT DOCUMENTS 2,317,159 4/1943 Well ................................ 252/301.4 P
2,347,644 5/1942 Sell .................................... 252/301.16
2,369,219 3/1946 Weagle ................................ 252/301.65
3,057,806 10/1962 Switzer ................................ 106/19 B
3,392,123 7/1968 Winberg ................................ 106/19 B
5,116,533 5/1992 Grandmont et al. .................. 106/19 E

FOREIGN PATENT DOCUMENTS 15553 10/1991 WIPO .................................. 106/19 B

*Primary Examiner*—Helene Klemanski
*Attorney, Agent, or Firm*—Herbert L. Bello

[57] ABSTRACT

A composition of a wax-based vehicle, suspension medium, and pigment particles to provide a marking material having a substantially uniform suspension of pigment particles and a method for its manufacture. The marking material includes a wax-based vehicle, a suspension matrix, and, if desired, a particulate suspending agent. The suspension matrix is formed by mixing together a long flow viscosity modifier and at least one short flow viscosity modifier. The particulate suspending agent is typically a micronized particulate substrate. The pigment particles impart phosphorescent or other desirable marking effects.

24 Claims, 1 Drawing Sheet

10
12
16
14
18

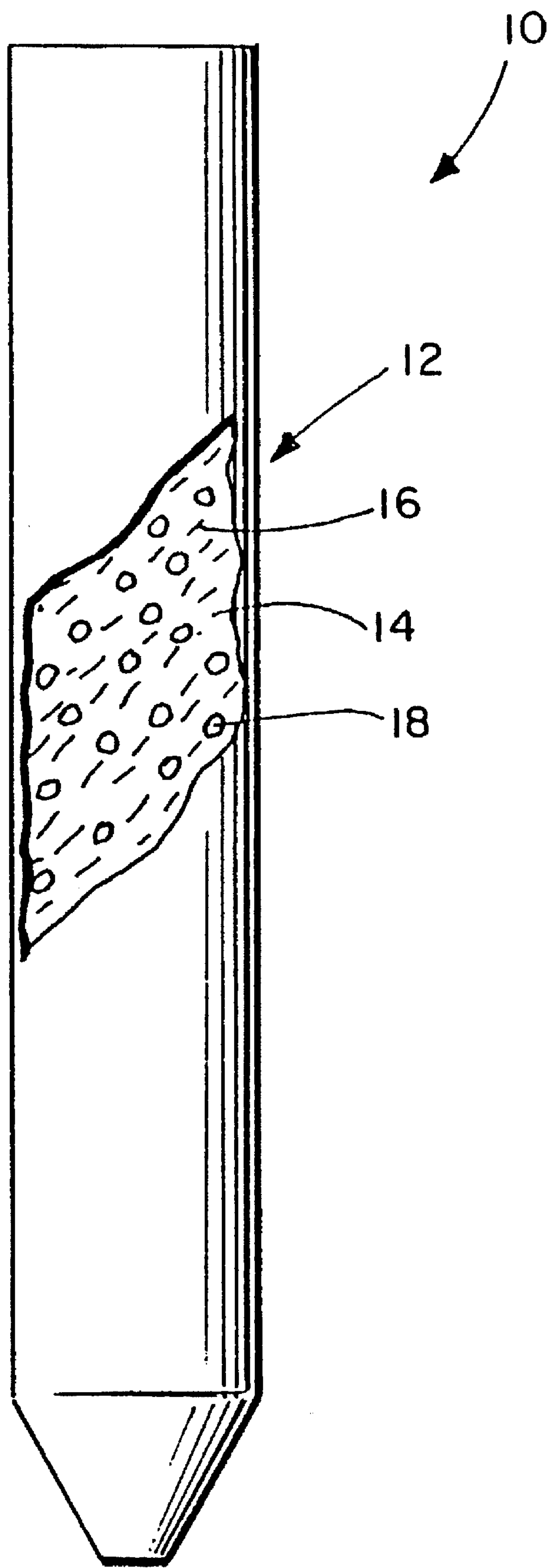
10
12
16
14
18

MARKING MATERIAL AND METHOD FOR SUSPENDING PIGMENT PARTICLES

BACKGROUND OF THE INVENTION

1. Field of the Invention

The present invention relates to marking materials and, more particularly, is directed to phosphorescent marking materials and a method for suspending pigment particles.

2. Description of the Prior Art

Phosphorescent marking crayons currently available on the market have met with limited success because they frequently fail to exhibit favorable glow and marking characteristics. Generally, the cause of these deficiencies relates to the suspension characteristics of the phosphorescent pigment particles in the crayon. Although various techniques have been suggested to assist in the suspension of pigment particles in marking crayons, the materials used in these methodologies can adversely impact transparency, mechanical strength, and marking ability.

Attempts to produce markers having good legibility and transparency to phosphorescent light have focused on the use of additives in conjunction with pigmenting materials. For example, U.S. Pat. No. 5,116,533, which is owned by the assignee of the present application, teaches suspension of pigment particles in a phosphorescent marker by means of filler particles. It has been found that, to a certain degree, these filler particles decrease transparency and interfere with the transmission of light to and from phosphorescent particles.

Alternative techniques presented in the prior art have utilized viscosity modifiers at selected concentrations. Two types of such modifiers which are typically used are long flow viscosity modifiers and short flow viscosity modifiers. Typical long flow viscosity modifiers are polyethylene and vinyl acetates. Salt activated waxes can be used as a short flow viscosity modifiers. The viscosity modifier concentrations taught in the prior art frequently produce undesirable effects during the manufacturing process such as agglomeration of particulates or rapid gelling of the marking material.

A need has arisen for an improved suspension medium and, in particular, for a marking material which exhibits improved transparency, mechanical strength, and marking characteristics.

SUMMARY OF THE INVENTION

It is an object of the present invention to provide a marking material which does not suffer from the foregoing disadvantages and limitations.

It is another object of the present invention to provide a phosphorescent marking material with improved particle suspension characteristics that can be used in a variety of applications including glow-in-the-dark crayons.

It is yet another object of the invention to provide an improved method for suspending particulate substrates in a wax-based marking material.

The present invention teaches an improved phosphorescent marking material, an improved suspension medium, and a method for making such a marking material that is characterized by a substantially uniform suspension of pigment particles. The marking material includes a wax-based vehicle and additives having melting points between the range of 100 and 220 degrees Fahrenheit. Preferably, the components of the marker of the invention also preferably exhibit increasing viscosity at lower temperatures with a workable range of 145 to 200 degrees Fahrenheit. In operation, these additives optimize marker transparency while assisting to provide a uniform suspension matrix for particles which have a specific gravity greater than the additives themselves. Advantageously, the blend of wax-base vehicle and suspension matrix also exhibits a viscosity that is compatible with currently used manufacturing techniques. The blend is also transparent to light excitation of the phosphors.

The present invention also provides a method for the suspension of pigment particles through the use of selected fillers having graded particle sizes.

The marking material of the invention is characterized by a wax-base vehicle, a suspension matrix, and inert pigment particles. The pigment particles, preferably phosphorescent particles, are uniformly suspended in the marking material. Typically, the wax-based vehicle is a paraffin wax and the suspension matrix includes a long flow viscosity modifier combined with at least one short flow viscosity modifier. The long flow viscosity modifier can be an ethylene vinyl acetate and the short flow viscosity modifier can be a low density polymer or an ester. In one embodiment, for enhanced suspension and mechanical strength, the marking material also includes, together with the suspension matrix or in isolation, a particulate substrate that is at least partially transparent to actinic radiation. If included, the substrate has a cross-sectional particle size of up to about 40 microns. A micronized substrate is preferred.

The invention also contemplates a method of suspending a particulate substrate, for example, phosphorescent and/or fluorescent particles, in a wax-based vehicle to produce a marking material. Typically, to commence the method of the invention, a wax-based vehicle is prepared using a paraffin wax. Once the wax-based vehicle is completely melted, a suspending matrix, or the individual components thereof, is mixed into it. Mixing continues until a uniform system of the wax-based vehicle and suspension matrix results. Alternatively, a particulate substrate can be substituted for the suspension matrix, or added to the wax-based vehicle/suspension matrix blend. To complete the process of the invention and produce a final blend, the desired pigment particles are mixed into the supplemented wax-based vehicle using a disperser. Since the final blend is subsequently used for molding or extrusion, the introduction of the pigment particles into the wax/filler mixture is preferably conducted at a rate selected to avoid the formation of air bubbles. When mixing is complete, the final blend or composition is characterized by a continuous non-settling suspension of the pigment particles in the marking material. This material can then be extruded or molded as desired.

Other general and specific objects of the invention will in part be obvious and will in part appear hereinafter.

The invention accordingly comprises the steps and apparatus embodying features of construction, combinations of elements and arrangements of parts adapted to effect such steps, as exemplified in the following detailed disclosure, the scope of the invention being indicated in the accompanying claims.

BRIEF DESCRIPTION OF THE DRAWINGS

A fuller understanding of the nature and objects of the present invention will become apparent upon consideration of the following detailed description taken in connection with the accompanying drawing in which there is shown a side view, partially cut-away, of a crayon embodying the invention.

DETAILED DESCRIPTION OF THE PREFERRED EMBODIMENTS

Referring now to the drawing there is illustrated a marking material 10 in the form of a crayon 12. The marking material 10 includes a wax-based vehicle 14 having a substantially uniform and continuous suspension of pigment particles 16. The wax-based vehicle 14 can include a suspension matrix. Alternatively, a particulate substrate 18 can be included in the wax-based vehicle 14.

Typically, the wax-base vehicle 14 is a fully refined, white paraffin wax having a melting point preferably in the range of 140 to 145 degrees Fahrenheit. Useful paraffin waxes are sold by many petroleum companies, a particularly useful paraffin wax is sold under the trade name Mobilwax 140 by Mobile Oil Corporation. Other sources for paraffin waxes useful in the present invention include: Witco Corporation of New York, N.Y.; Boler Petroleum of Wayne, Pa.; Frank B. Ross Co., Inc. of Jersey City, N.J.; and, Strahl and Pitsch, Inc. of West Babylon, N.Y.

In an alternative embodiment of the invention, the wax-based vehicle 14 can be virtually any natural wax, synthetic wax, microcrystalline wax, or any other type of material that exhibits conventional wax properties. To be useful in connection with the present invention, the material forming the wax-based material 14 must be able to retain its general shape at room temperature and acquire gloss when rubbed. Generally, useful waxes include: esters of high molecular weight fatty acids with high molecular weight alcohols or fatty acids; mixtures of esters with fatty acids and alcohols and hydrocarbons; esters of fatty acids with high atomic weight alcohol radicals, either natural or synthetic waxes, for example, beeswax, myricyl palmitate, carnauba wax; and, synthetic polymers, particularly amorphous or microcrystalline polymers such as polypropylene, polyethylene, terpen resins, and phenolic resins.

In the preferred embodiment of the invention, a suspension matrix is added to the wax-based vehicle 14 using the methodology discussed below. More particularly, the suspension matrix may be added as a single unit or as individual components. The suspension matrix generally includes a long flow viscosity modifier combined with at least one short flow viscosity modifier.

The long flow viscosity modifier used in the material of the invention typically has a syrup-like consistency within a temperature range of 125 to 190 degrees Fahrenheit. The long flow viscosity modifier may be virtually any material that is compatible with the materials forming the wax-based vehicle 14. Typical long flow viscosity modifiers include acetates, rubber resins, and plastics. A particularly useful acetate is an ethylene vinyl acetate copolymer sold by E.I. Du Pont De Nemours & Co. of Wilmington, Del. under the trade name Elvax.

The short flow viscosity modifier used in the material of the invention typically has a gel-like, or paste-like, consistency within a temperature range of 125 to 190 degrees Fahrenheit. The short flow viscosity modifier can be virtually any material that is compatible with those materials forming the wax-based vehicle 14. Useful short flow viscosity modifiers include hydrogenated, oxidized, or sulfonated polyethylenes; polypropylenes; natural and synthetic wax mixtures; fatty acids; fatty amides; and terpen and phenolic resins. Derivatives of these materials can also be used. For example, low molecular weight polyethylene compounds sold under the trade name A-C Polyethylene Gels by Allied-Signal Corporation of Morristown, N.J. can be used. Of particular use is a polyethylene homopolymer having the designation AC6 and sold by Allied-Signal Corporation. Also useful in connection with the present invention are polyethylene homopolymers manufactured and sold by Frank B. Ross Co., Inc. of Jersey City, N.J. If desired, an additional short flow modifier may be used with the polyethylene compound selected. Useful waxes include salt activated ester derivatives of montan wax. The preferred embodiment of the invention incorporates a partially saponified ester derivative of this wax. A compound typically used in the preferred embodiment of the invention is sold under the trade name Hoechst Wax OP by Hoechst Celanese of Charlotte, N.C. is utilized. As explained in detail below, these materials are generally mixed under heat either as a unit, or individually into the wax-based vehicle 14.

The wax-based vehicle 14 can also include a particulate substrate 18. The particulate substrate 18 can be a micronized polyethylene, silica particles, or a micronized talcum power having particle sizes of up to about 40 microns. Useful micronized polyethylene materials are sold under the trade name T6 by Petrolite Company. An example of a useful micronized silica is an amorphic fumed silica which is sold under the trade name Aerosil 200 by Degussa Corporation. A representative talc material is sold under the trade name No. 1250 Micro Talc by the Charles B. Crystal Co., Inc. of New York, N.Y. Preferably, the particulate substrate 18 used in the invention is at least partially transparent actinic radiation. As in the case of the suspension matrix, the particulate substrate 18 assists in the suspension of pigment particles 16 in the wax-based vehicle 14 as well as improving the overall mechanical integrity of the marking material 10. When used, the particulate substrate 18 is mixed into the wax-based vehicle 14 using a disperser set at a speed selected to avoid the formation of air bubbles in the wax-based vehicle 14.

The pigment particles 16 may be virtually any particulate material which produces a desired marking effect. Selection of particular pigment particles 16 can be based on a variety of parameters including, for example, color, phosphorescence, reflectance, or magnetism. The pigment particles 16 typically have a particle size between about 0.25 and 100 microns. The pigment particles 16 can be up to 40 percent by weight of the marking material 10. Typically, the pigment particles 16 comprise between about 3 and 25 percent by weight of the marking material 10. The pigment particles 16 are added to the mixture of wax-based vehicle 14 using a disperser set at a speed selected to avoid the formation of air bubbles. A phosphorescent pigment that is particularly useful in connection with the present invention is that sold under the trade name of Phosphorescent Pigment 6SSU by the United Mineral and Chemical Corporation of Lyndhurst, N.J. In an alternative embodiment of the invention, the pigment particles 16 can be formed of an inert material such as glitter particles or glass particles.

The invention also contemplates a method of suspending a particulate substrate, that is, pigment particles 16, in a wax medium. To commence the method of the invention, a wax-based vehicle 14 is prepared. In particular, a paraffin wax is melted at between 175 to 200 degrees Fahrenheit until it forms a uniform melted mixture of the wax-based vehicle 14. Once the wax-based vehicle 14 is melted, a suspending matrix, or the components thereof, are added to the wax-based vehicle 14. Mixing is performed under heat, generally at a minimum of 200 degrees Fahrenheit, using a disperser set at a medium speed. Mixing continues until the wax-based vehicle 14 and the suspension matrix form a uniform mixture. In an alternative embodiment, a particulate substrate 18 can be substituted for the suspension matrix, or added to the wax-based vehicle/suspension matrix blend. To complete the process, the desired pigment particles 16, for example, phosphorescent particles, are mixed into the wax-based vehicle 14 using a disperser to produce a final blend. Since the final blend is subsequently used for molding or extrusion, the introduction of the pigment particles 16 into the wax/filler mixture is preferably conducted at a rate selected to avoid the formation of air bubbles. When mixing is complete, the final composition is characterized by a continuous non-settling suspension of the pigment particles 16 in the wax-based vehicle 14. This material can then be extruded or molded as desired.

The following are illustrative, non-limiting examples of the procedures for making a marker or crayon embodying the invention.

EXAMPLE I

A solution was prepared by heating and melting at 180 degrees Fahrenheit 56 grams of a paraffin wax, sold under the trade name Mobilwax 140 by Mobile Oil Corporation, 3 grams of a montan wax derivative, sold under the trade name OP Hoechst wax by Hoechst Celanese of Charlotte, N.C., 3 grams of polyethylene, sold under the trade name Ross AC6 by Frank B. Ross Co., Inc. of Jersey City, N.J., and 2 grams of Petrolatum, sold under the trade name Ross Petrolatum by Frank B. Ross Co., Inc. Once fully liquified, 30 additional grams of the paraffin wax was added. The solution was then heated to 210 degrees Fahrenheit until fully liquified. Once the wax mixture was liquified and had attained a constant temperature of approximately 210 degrees Fahrenheit, 2 grams of an ethylene vinyl acetate, sold under the trade name Dupont Elvax No. 210 by E.I. Du Pont De Nemours & Co. of Wilmington, Del. were added. This mixture was again heated to at least 260 degrees Fahrenheit until fully liquified and then allowed to cool to between 150 and 175 degrees Fahrenheit. Next, 15 grams of Riedel Green NF, a phosphorescent pigment, and 2 grams of Radiant Green pigment, specifically Radiant Green RG GR 9019 sold by Radiant Color Division, was mixed into the wax blend using a disperser set at a speed sufficient to achieve a substantially uniform mixture and avoid the formation of air bubbles. The final marking mixture was poured into a mold having a cavity in the shape of a crayon and actively cooled. After cooling, the crayon was removed from the mold.

The crayon produced using the above-described procedure had a uniform suspension of particles throughout its body. The crayon also had significant mechanical strength and marked well on a variety of surfaces. The phosphorescent particles imparted luminescent properties to markings made by the crayon. No significant deterioration of the markings was observed over a period of several days.

EXAMPLE II

A solution was prepared by heating and melting at 180 degrees Fahrenheit 4.02 grams of a montan wax derivative, sold under the trade name OP Hoechst wax by Hoechst Celanese of Charlotte, N.C., 5.36 grams of Fischer Tropsch wax, sold under the trade name Ross Wax #100 Fischer Tropsch by Frank B. Ross Co., Inc. of Jersey City, N.J., and 2.68 grams of polyethylene, sold under the trade name Ross AC6 by Frank B. Ross Co., Inc. Once fully liquified, 5.36 grams of an ethylene vinyl acetate, sold under the trade name Dupont Elvax No. 210 by E.I. Du Pont De Nemours & Co. of Wilmington, Del. were added. Next, 40.2 grams of paraffin wax, sold under the trade name Ross 140F paraffin, and 15.5 grams of petrolatum, sold under the trade name Ross Petrolatum, both manufactured by Frank B. Ross Co., Inc. were added. The solution was then heated to 210 degrees Fahrenheit until fully liquified. Once the wax mixture was liquified, 22.78 grams of Riedel Green NF, a phosphorescent pigment, and 4.02 grams of green pigment, specifically Radient Green GR 9011 sold by Radiant Color Division, was mixed into the wax blend using a disperser set at a speed sufficient to achieve a substantially uniform mixture and avoid the formation of air bubbles. The final marking mixture was poured into a mold having a cavity in the shape of a crayon and actively cooled. After cooling, the crayon was removed from the mold.

The crayon produced using the above-described procedure had a uniform suspension of particles throughout its body. The crayon also had significant mechanical strength and marked well on a variety of surfaces. The phosphorescent particles imparted luminescent properties to markings made by the crayon. No significant deterioration of the markings was observed over a period of several days.

EXAMPLE III

A solution was prepared by heating and melting at 180 degrees Fahrenheit 31.1 grams of a paraffin wax, sold under the trade name Mobilwax 140 by Mobile Oil Corporation, 18.7 grams of Fischer Tropsch wax, sold under the trade name Ross Wax #100 Fischer Tropsch Wax by Frank B. Ross Co., Inc. of Jersey City, N.J., and 12.4 grams of white petrolatum, also manufactured and sold by Frank B. Ross Co., Inc. Once fully liquified, 5.7 grams of talc, sold under the trade name Talc No. 1250 by Charles B. Crystal Co., Inc. of New York, N.Y., and 1.9 grams of fumed silica, sold under the trade name Aerosil 200 by Degussa Corporation, were added with mixing to the above-described wax blend. In the next step, 28.3 grams of a phosphorescent pigment, manufactured by United Mineral and Chemical Co. and sold under the trade name 6SSUY, and 1.9 grams of a yellow fluorescent pigment, sold under the trade name FB 205 and manufactured by United Mineral and Chemical Co. were added to the hot melt blend and mixed until a homogenous system was achieved. The final marking mixture was poured into a mold having a cavity in the shape of a crayon and actively cooled. After cooling, the crayon was removed from the mold.

The crayon produced using the above-described procedure had a uniform suspension of particles throughout its body. The crayon also had significant mechanical strength and marked well on a variety of surfaces. The phosphorescent particles imparted luminescent properties to markings made by the crayon. No significant deterioration of the markings was observed over a period of several days.

EXAMPLE IV

A solution was prepared by heating and melting at 180 degrees Fahrenheit 31.7 grams of a paraffin wax, sold under the trade name Mobilwax 140 by Mobile Oil Corporation, 19.1 grams of Fischer Tropsch wax, sold under the trade name Ross Wax #100 Fischer Tropsch Wax by Frank B. Ross Co., Inc. of Jersey City, N.J., and 12.7 grams of white petrolatum, also manufactured and sold by Frank B. Ross Co., Inc. Once fully liquified, 5.8 grams of talc, sold under the trade name Talc No. 1250 by Charles B. Crystal Co., Inc. of New York, N.Y., and 1.9 grams of fumed silica, sold under the trade name Aerosil 200 by Degussa Corporation, were added with mixing to the above-described wax blend. In the next step, 28.8 grams of a phosphorescent pigment, manufactured by United Mineral and Chemical Co. and sold under the trade name 6SSU was added to the hot melt blend and mixed until a homogenous system was achieved. The final marking mixture was poured into a mold having a cavity in the shape of a crayon and actively cooled. After cooling, the crayon was removed from the mold.

The crayon produced using the above-described procedure had a uniform suspension of particles throughout its body. The crayon also had significant mechanical strength and marked well on a variety of surfaces. The phosphorescent particles imparted luminescent properties to markings made by the crayon. No significant deterioration of the markings was observed over a period of several days.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A marking material comprising a wax-based vehicle, a suspension matrix, and inert pigment particles, said pigment particles being uniformly suspended in said marking material, said pigment particles having a particle size of from about 0.25 microns to 100 microns.

2. The marking material of claim 1 wherein said wax-based vehicle is a paraffin wax.

3. The marking material of claim 1 wherein said suspension matrix includes a long flow viscosity modifier and at least one short flow viscosity modifier.

4. The marking material of claim 3 wherein said long flow viscosity modifier is ethylene polyvinyl acetate.

5. The marking material of claim 3 wherein said short flow viscosity modifier is a low density polymer.

6. The marking material of claim 3 wherein said short flow viscosity modifier is an ester.

7. The marking material of claim 1 further including a particulate substrate.

8. The marking material of claim 1 wherein said inert pigment particles are phosphorescent particles.

9. A marking material comprising a wax-based vehicle, a particulate suspending agent, and inert pigment particles, said pigment particles being uniformly suspended in said marking material and having a particle size of from about 0.25 microns to 100 microns.

10. The marking material of claim 9 wherein said wax-based vehicle is a paraffin wax.

11. The marking material of claim 9 wherein said particulate substrate is a micronized particulate substrate.

12. The marking material of claim 11 wherein said micronized particulate substrate includes particles having a cross-sectional particle size of up to about 40 microns.

13. The marking material of claim 9 wherein said pigment particles are phosphorescent particles.

14. A phosphorescent marking material comprising a wax-based vehicle, a suspension matrix, a particulate suspending agent, and inert pigment particles, said inert pigment particles having a particle size of from about 0.25 microns to 100 microns.

15. The marking material of claim 14 wherein said wax-based vehicle is a paraffin wax.

16. The marking material of claim 14 wherein said suspension matrix includes a long flow viscosity modifier and at least one short flow viscosity modifier.

17. The marking material of claim 16 wherein said long flow viscosity modifier is ethylene polyvinyl acetate.

18. The marking material of claim 16 wherein said short flow viscosity modifier is a low density polymer.

19. The marking material of claim 16 wherein said short flow viscosity modifier is an ester.

20. The marking material of claim 14 wherein said particulate suspending agent is a micronized particulate substrate.

21. The marking material of claim 20 wherein said micronized particulate substrate includes particles having a cross-sectional particle size of up to about 40 microns.

22. The marking material of claim 1 wherein said wax-based vehicle is a synthetic polymer.

23. The marking material of claim 9 wherein said wax-based vehicle is a synthetic polymer.

24. The phosphorescent marking material of claim 14 wherein said wax-based vehicle is a synthetic polymer.

* * * * *